United States Patent
Ma et al.

(10) Patent No.: US 11,796,128 B1
(45) Date of Patent: Oct. 24, 2023

(54) TWO-IN-ONE MULTI-FUNCTIONAL MAGNETIC BRACKET

(71) Applicants: Wenhong Ma, Guangdong (CN); Jiawei Gao, Guangdong (CN)

(72) Inventors: Wenhong Ma, Guangdong (CN); Jiawei Gao, Guangdong (CN)

(73) Assignee: Guangdong Shuowei Technology Co., Ltd., Dongguan (CN)

( * ) Notice: Subject to any disclaimer, the term of this patent is extended or adjusted under 35 U.S.C. 154(b) by 0 days.

(21) Appl. No.: 18/213,905

(22) Filed: Jun. 26, 2023

(51) Int. Cl.
- *F16M 13/02* (2006.01)
- *H04M 1/04* (2006.01)
- *H01F 7/02* (2006.01)

(52) U.S. Cl.
CPC ......... *F16M 13/022* (2013.01); *H01F 7/0205* (2013.01); *H04M 1/04* (2013.01)

(58) Field of Classification Search
CPC ...... F16M 13/022; H01F 7/0205; H04M 1/04; F16B 47/00; F16B 2/08; A45F 5/02
USPC .................... 248/683, 206.5, 309.4, 292.12; 455/575.1
See application file for complete search history.

(56) References Cited

U.S. PATENT DOCUMENTS

| | | | |
|---|---|---|---|
| 9,164,126 B1* | 10/2015 | Rodda | G01R 1/04 |
| 9,548,782 B1* | 1/2017 | Jeong | B60R 11/02 |
| 9,723,910 B2* | 8/2017 | Due | A45F 5/10 |
| 10,419,054 B1* | 9/2019 | VanTassell | H04M 1/04 |
| 10,760,732 B1* | 9/2020 | Koh | F16M 13/02 |
| 11,265,035 B1* | 3/2022 | Zhang | H04B 1/3877 |
| 11,545,819 B2* | 1/2023 | Fan | H02J 7/02 |
| 11,658,694 B1* | 5/2023 | Wang | H04B 1/3888 455/575.8 |
| 2015/0382489 A1* | 12/2015 | Sorensen | F16M 11/40 24/3.1 |

\* cited by examiner

*Primary Examiner* — Todd M Epps (57) ABSTRACT

A multi-functional magnetic bracket includes a first bracket with a magnet disposed therein to magnetically attach the first bracket to mobile phone; a second bracket movably connected to the first bracket through a connecting arm, the second bracket and a hinging arm being accommodated to inside of the first bracket, and a ring and a tooth slot opened in the second bracket; and a connector disposed in the second bracket and combined with the second bracket to form a multi-platform bracket for mounting the second bracket on different scenarios and platforms. The connector includes a base of which a surface is adhered to the platform, a limiting buckle disposed in the base and of which one end extends to a side of the second bracket, and a spring bead disposed in the base and of which one end extends to inside of the tooth slot.

10 Claims, 7 Drawing Sheets

TWO-IN-ONE MULTI-FUNCTIONAL MAGNETIC BRACKET

BACKGROUND OF THE INVENTION

1. Field of the Invention

The invention relates to magnetic brackets and more particularly to a two-in-one multi-functional magnetic bracket.

2. Description of Related Art

Conventionally, a magnetic bracket is attached to a mobile phone in a magnetic manner to support a mobile phone on a desktop. However, the conventional magnetic bracket has the following deficiencies during use:

Most conventional magnetic brackets on the market only have a function of supporting the mobile phone on the desktop, with a single function, and can be switched according to different scenarios and platforms. When being used on a center console in a car or in an office scenario, the magnetic bracket is suspended on a side of a desktop computer. However, in comparison of information, a special magnetic bracket needs to be bought to fix the mobile phone. Therefore, a user needs to prepare a plurality of magnetic brackets with different functions. This is inconvenient to carry and raises an economic expenditure, and brings a serious trouble to the user.

Thus, the need for improvement still exists.

SUMMARY OF THE INVENTION

To achieve the above objective, the invention provides the following technical solutions: A two-in-one multi-functional magnetic bracket comprises a first bracket, where a magnet is embedded in an inner part of the first bracket, to enable the first bracket to be magnetically attached to a mobile phone; a second bracket, where the second brackets movably connected to the first bracket through a connecting arm, the second bracket and a hinging arm are accommodated to the inner part of the first bracket by flipping, and a ring of tooth slot are opened in an inner part of the second bracket; and a connector, snapped in the inner part of the second bracket and combined with the second bracket to form a multi-platform bracket for mounting the second bracket on different scenarios and platforms, where the connector includes a base of which a surface is adhered to the platform, a limiting buckle that is disposed in an inner part of the base and of which one end extends to a side of the second bracket, and a spring bead that is disposed in the base and of which one end extends to an inner side of the tooth slot, when the limiting buckle is pulled away from the second bracket, the second bracket pulled, to separate the second bracket from the connector.

In a preferred technical solution of the invention, the first bracket is in an annular shape, and an accommodation hole is opened in the first bracket, to accommodate the second bracket and a wireless charger, a first notch is opened on a surface of the first bracket, and a first rotation axis is disposed in an inner part of the first notch.

In a preferred technical solution of the invention, the second bracket is in an annular shape, and a second notch is opened on a surface of the second bracket, a second rotation axis is disposed in an inner part of the second notch, one end of the hinging arm extends to the inner part of the first notch and is snapped to a surface of the first rotation axis, and the other end of the hinging arm extends to the inner part of the second notch and is snapped to a surface of the second rotation axis.

In a preferred technical solution of the invention, a placement slot in which the first brackets placed is opened on a side of the hinging arm, a slip resistant pad that is used to cover the magnet is disposed on one side of the first bracket, and a decorative sticker is disposed on the other side of the first bracket.

In a preferred technical solution of the invention, at least one first movable slot is disposed in the inner part of the base at equal intervals in an annular shape, the limiting buckle is movably disposed in an inner part of the first movable slot, a quantity of the limiting buckles is equal to a quantity of the first movable slots, and a pressure spring of which one end abuts against one phase of the limiting buckle is disposed in the inner part of the first movable slot.

In a preferred technical solution of the invention, a slant block is disposed at one end of a limiting buckle located in the movable slot, a snap-fastener is movably disposed on a side of the base, a press block corresponding to the slant block is disposed on the snap-fastener, when the snap-fastener is pressed, the snap-fastener drives the press block to abut against the slant block, and the slant block is abutted to drive the limiting buckle to compress the pressure spring and separate from the second bracket.

In a preferred technical solution of the invention, a cover plate is disposed on the side of the base, a through hole is opened in an inner part of the cover plate, and a side of the snap-fastener extends to an inner part of the through hole.

In a preferred technical solution of the invention, at least one first movable slot is disposed in the inner part of the base at equal intervals in an annular shape, the spring bead is movably disposed in an inner part of the first movable slot, and a quantity of the spring beads is equal to a quantity of the second movable slots.

In a preferred technical solution of the invention, a clamping groove of which one end extends to the inner part of the first movable slot and is clamped with the spring bead is disposed on a side of the cover plate.

In a preferred technical solution of the invention, an adhesive mat is disposed on a side, far away from the cover plate, of the base.

The invention has the following advantages and benefits in comparison with a single-function magnetic bracket of the conventional art:

The two-in-one multi-functional magnetic bracket can be used on a desktop, and can be suspended on a side of an office computer or mounted in a center console of a car through the base. When the connector is separated from and the second bracket, the second bracket can be sleeved in a finger as a finger ring, to support the product by hands. When the two-in-one multi-functional magnetic first brackets used on the desktop, the two-in-one multi-functional magnetic bracket can be adjusted and supported at 360°. The two-in-one multi-functional magnetic first brackets applicable to a variety of scenarios and platforms, to ensure usability of the product. The product has an application prospect.

The above and other objects, features and advantages of the invention will become apparent from the following detailed description taken with the accompanying drawings.

DETAILED DESCRIPTION OF THE INVENTION

Referring to FIGS. 1 to 7, a two-in-one multi-functional magnetic bracket of the invention comprises the following components as discussed in detail below.

A first bracket 1 is provided, where a magnet 14 is embedded in an inner part of the first bracket 1, to enable the first bracket 1 to be magnetically attached to a mobile phone.

A second bracket 2 is provided, where the second bracket 2 is movably connected to the first bracket 1 through a connecting arm, the second bracket 2 and a hinging arm 3 are accommodated to the inner part of the first bracket 1 by flipping, and a ring of tooth slot 21 are opened in an inner part of the second bracket 2.

A connector 4 is, snapped in the inner part of the second bracket 2 and combined with the second bracket 2 to form a multi-platform bracket for mounting the second bracket 2 on different scenarios and platforms, where the connector 4 includes a base 41 of which a surface is adhered to the platform, a limiting buckle 44 that is disposed in an inner part of the base 41 and of which one end extends to a side of the second bracket 2, and a spring bead 431 that is disposed in the base 41 and of which one end extends to an inner side of the tooth slot 21, when the limiting buckle 44 is pulled away from the second bracket 2, the second bracket 2 is pulled, to separate the second bracket 2 from the connector 4.

In a specific technical solution of the embodiment, the first bracket 1 is in an annular shape, and an accommodation hole 11 is opened in the first bracket 1, to accommodate the second bracket 2 and a wireless charger. A first notch 12 is opened on a surface of the first bracket 1, and a first rotation axis 33 is disposed in an inner part of the first notch 12.

Figure 6:
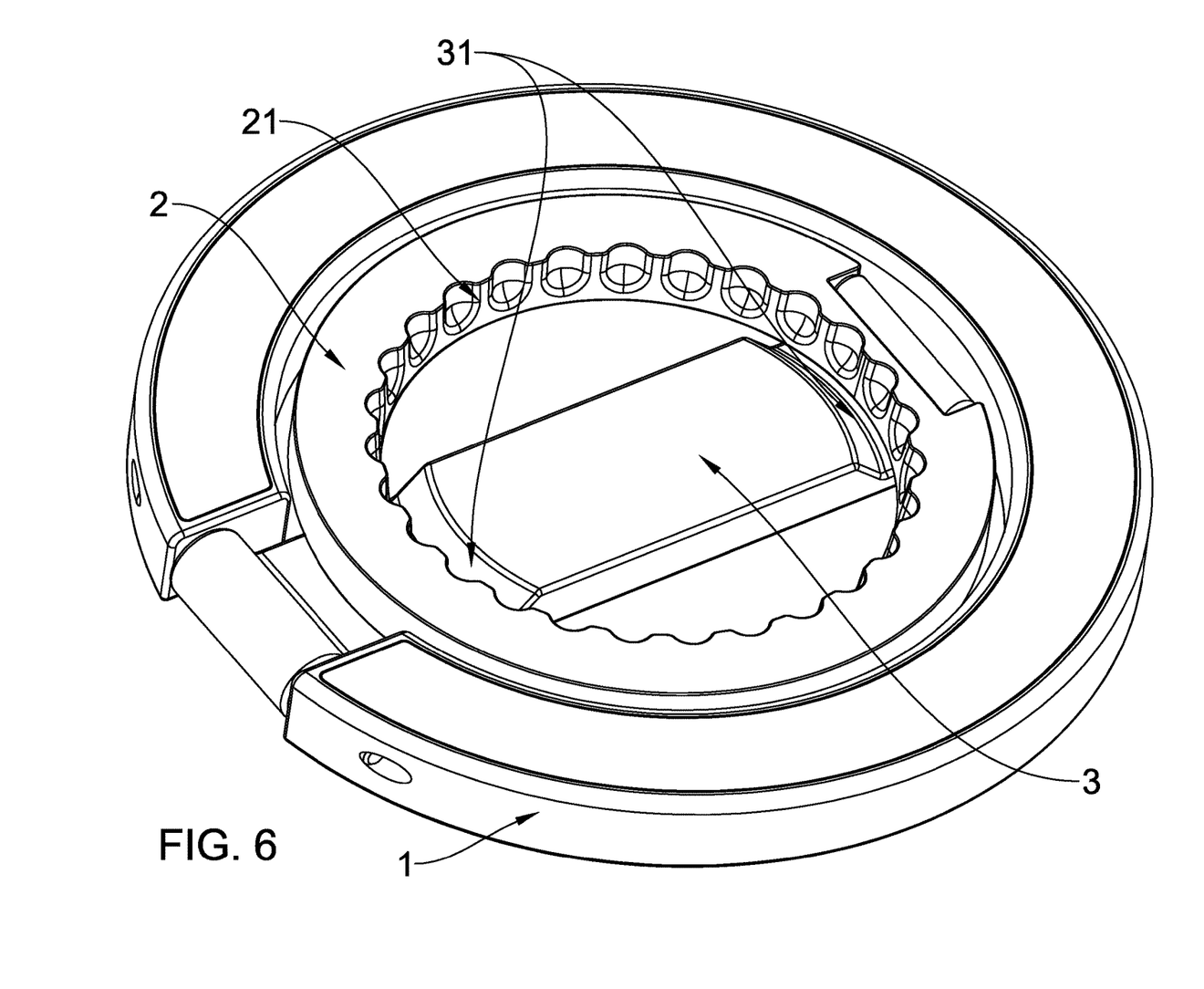
FIG. 6 is a perspective view of the folded two-in-one multi-functional magnetic bracket.
Figure 7:
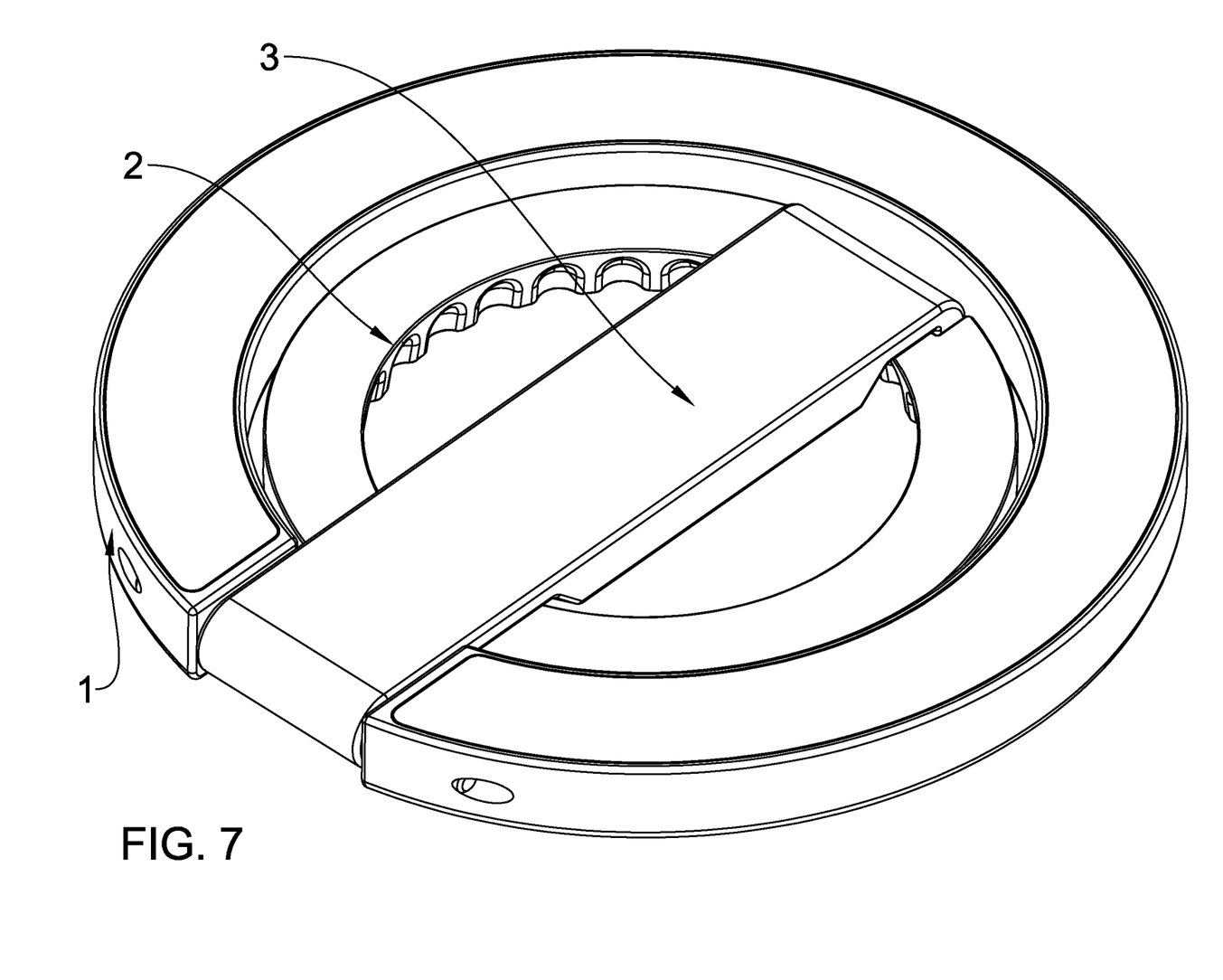
FIG. 7 is another perspective view of the folded two-in-one multi-functional magnetic bracket.

As shown in FIGS. 6 and 7 specifically, the first bracket 1 is attached to the mobile phone by using the magnet 14, and the second bracket 2 is flipped out of the inner part of the accommodation hole 11 through the hinging arm 3, so that the wireless charger may be placed in the inner part of the accommodation hole 11. This is more convenient to use.

In a specific technical solution of the embodiment, the second bracket 2 is in an annular shape, and a second notch 22 is opened on a surface of the second bracket 2, a second rotation axis 23 is disposed in an inner part of the second notch 22, one end of the hinging arm 3 extends to the inner part of the first notch 12 and is snapped to a surface of the first rotation axis 33, and the other end of the hinging arm 3 extends to the inner part of the second notch 22 and is snapped to a surface of the second rotation axis 23. Through the first rotation axis 33 and the second rotation axis 23, the first bracket 1, the hinging arm 3, the second bracket 2, and the hinging arm 3 may rotate, to facilitate the adjustment of a support angle.

In a specific technical solution of the embodiment, a placement slot 31 in which the second bracket 2 is placed is opened on a side of the hinging arm 3. A slip resistant pad 15 that is used to cover the magnet 14 is disposed on one side of the first bracket 1. A decorative sticker 16 is disposed on the other side of the first bracket 1. The slip resistant pad 15 is made of a rubber material. Therefore, when being attached to a mobile phone of a user, the slip resistant pad 15 is not worn, slip resistant effect is excellent, and adsorption is more stable. The decorative sticker 16 is used to decorate the side of the first bracket 1, so that appearance is more beautiful.

In a specific technical solution of the embodiment, at least one first movable slot 42 is disposed in the inner part of the base 41 at equal intervals in an annular shape. The limiting buckle 44 is movably disposed in an inner part of the first movable slot 42. A quantity of the limiting buckles 44 is equal to a quantity of the first movable slots 42. A pressure spring 46 of which one end abuts against one phase of the limiting buckle 44 is disposed in the inner part of the first movable slot 42. The first movable slot 42 is used to mount the limiting buckle 44. Therefore, the limiting buckle 44 may be more stably retracted, and when the limiting buckle 44 slides toward the inner part of the first movable slot 42, the limiting buckle 44 may compress the pressure spring 46, and while the compression spring 46 may continuously abut against the limiting buckle 44. Therefore, when the user releases a snap-fastener 47, the compression spring 46 springs back and abuts against the limiting buckle 44, to enable the limiting buckle 44 to automatically move toward an outer part of the first movable slot 42.

In a specific technical solution of the embodiment, a slant block 45 is disposed at one end of a limiting buckle 44 located in the movable slot. The snap-fastener 47 is movably disposed on a side of the base 41. A press block 471 corresponding to the slant block 45 is disposed on the snap-fastener 47. A cover plate 48 is disposed on the side of the base 41, a through hole 481 is opened in an inner part of the cover plate 48, and a side of the snap-fastener 47 extends to an inner part of the through hole 481. When the snap-fastener 47 is pressed, the snap-fastener 47 drives the press block 471 to abut against the slant block 45, and the slant block 45 is abutted to drive the limiting buckle 44 to compress the pressure spring 46 and separate from the second bracket 2.

Figure 1:
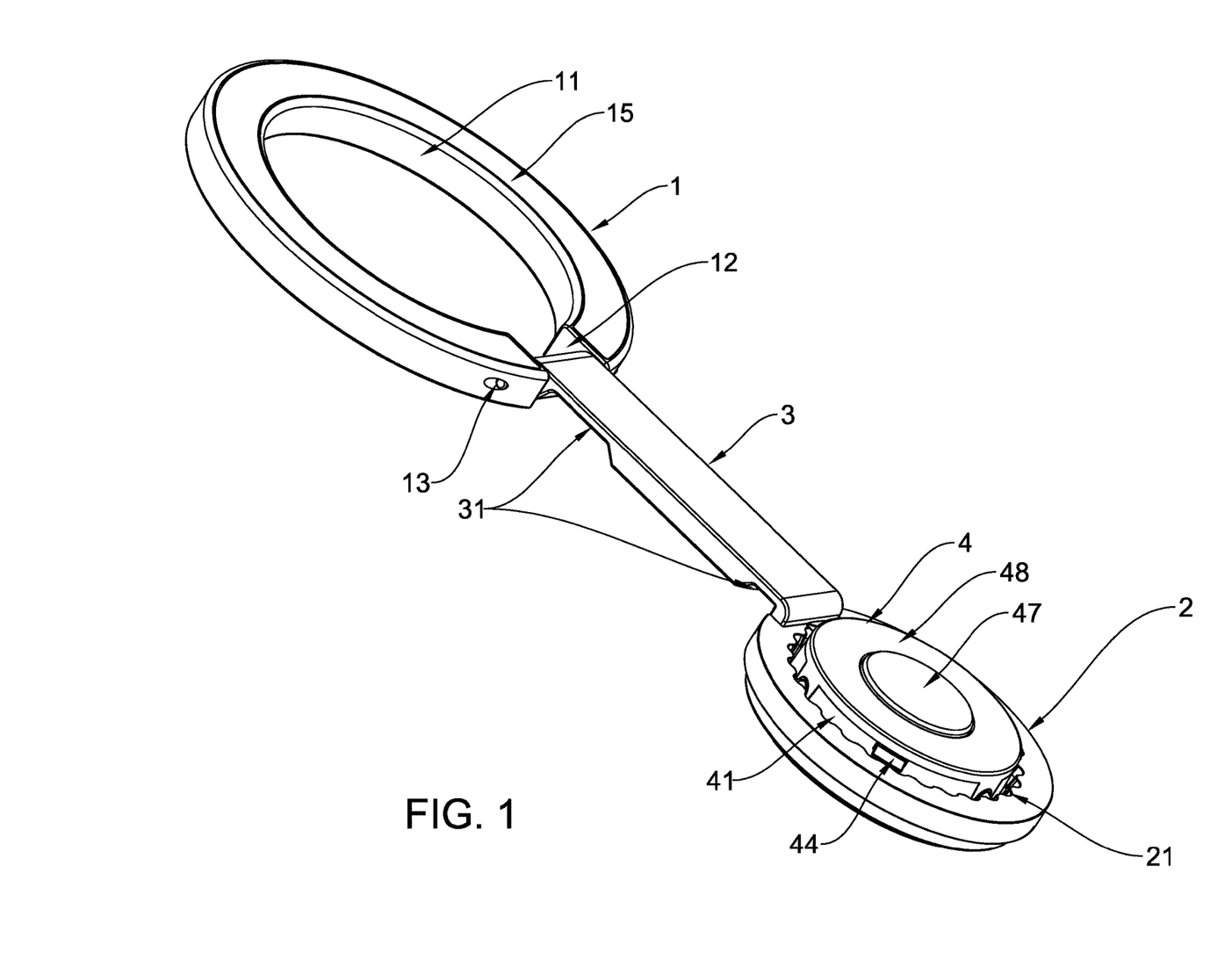
FIG. 1 is a perspective view of a two-in-one multi-functional magnetic bracket according to the invention.
Figure 2:
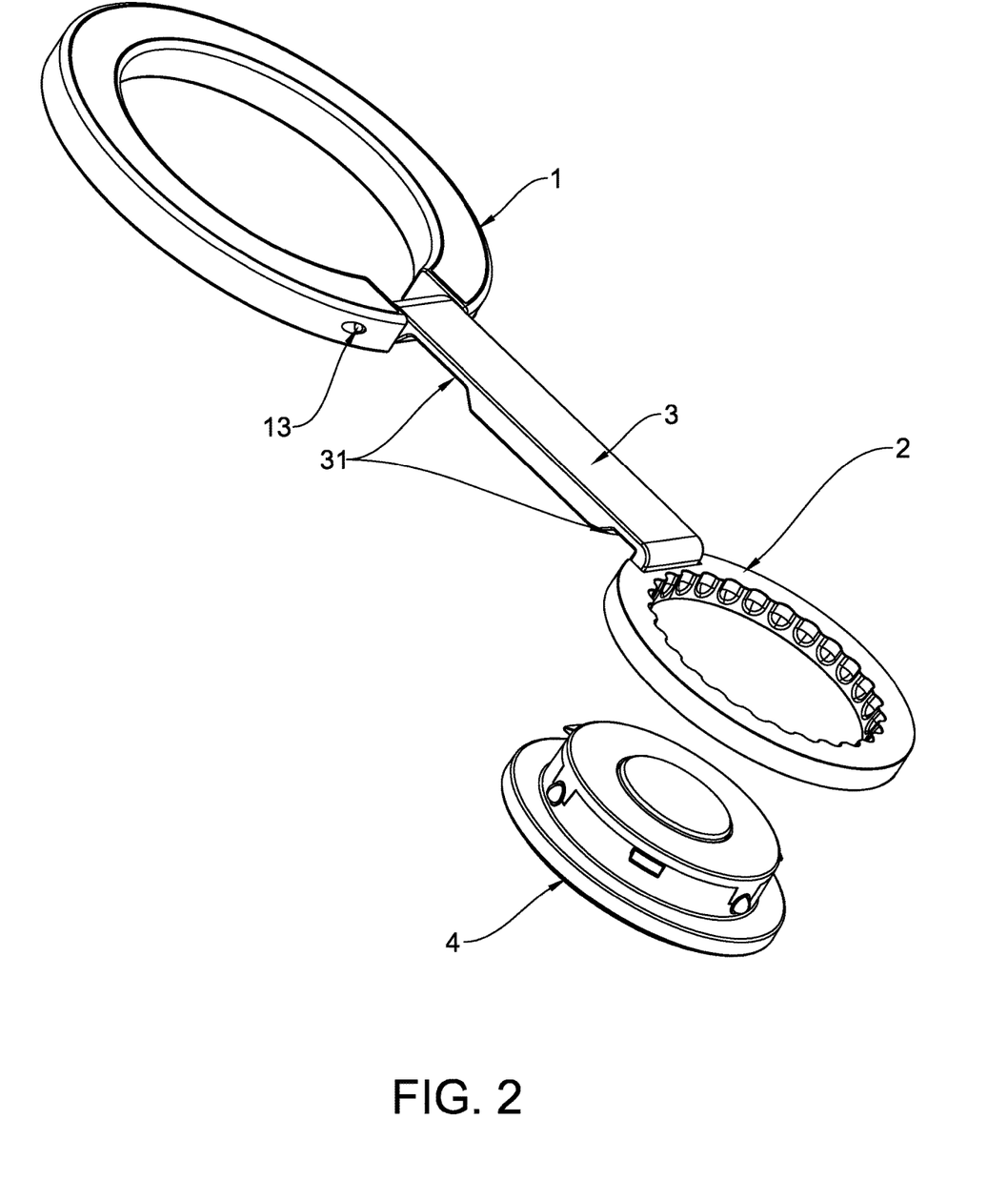
FIG. 2 is a view similar to FIG. 1 with the connector separated.
Figure 3:
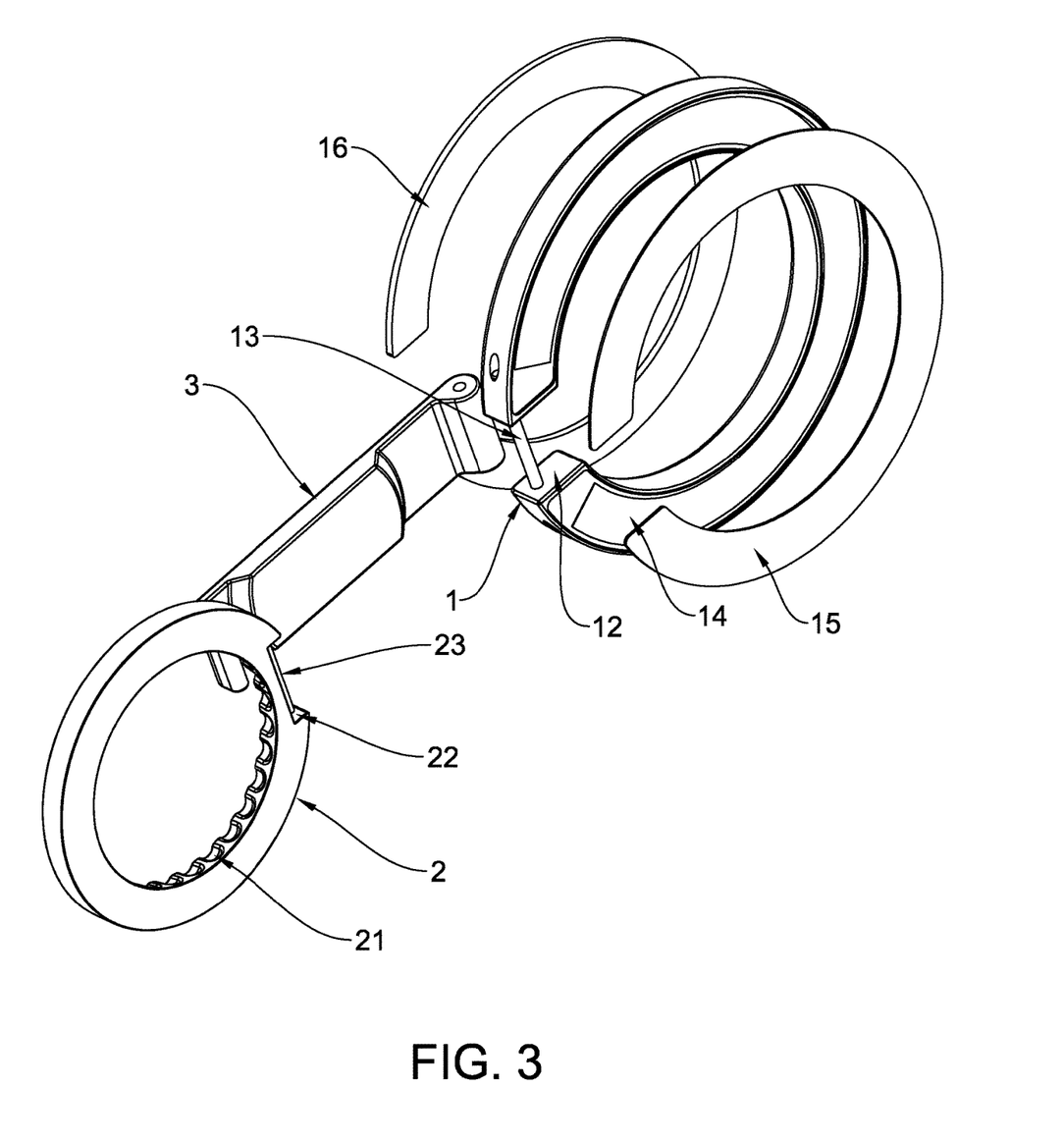
FIG. 3 is a view similar to FIG. 2 with the connector removed and the first bracket shown in an exploded manner.
Figure 4:
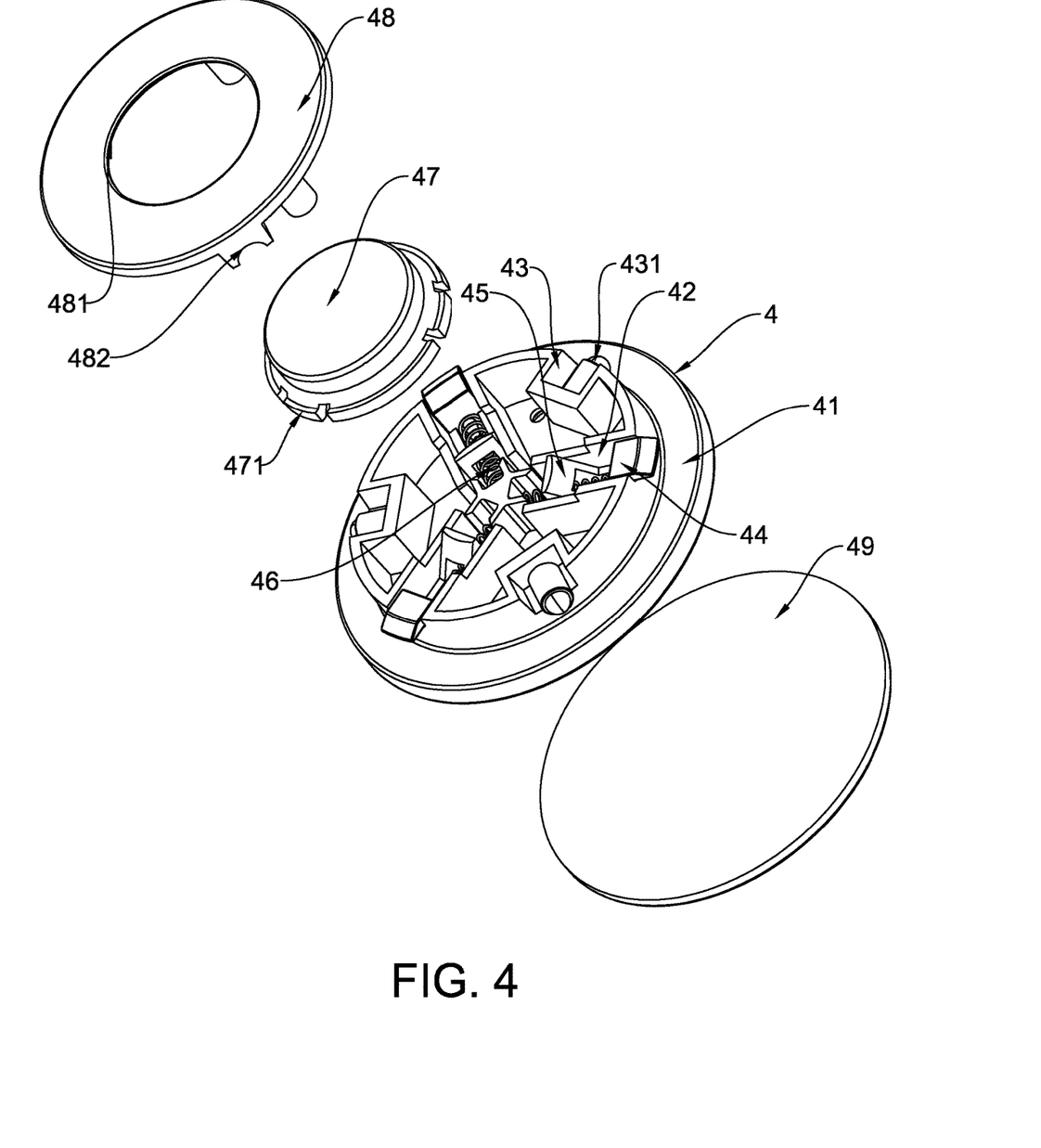
FIG. 4 is an exploded view of the connector.
Figure 5:
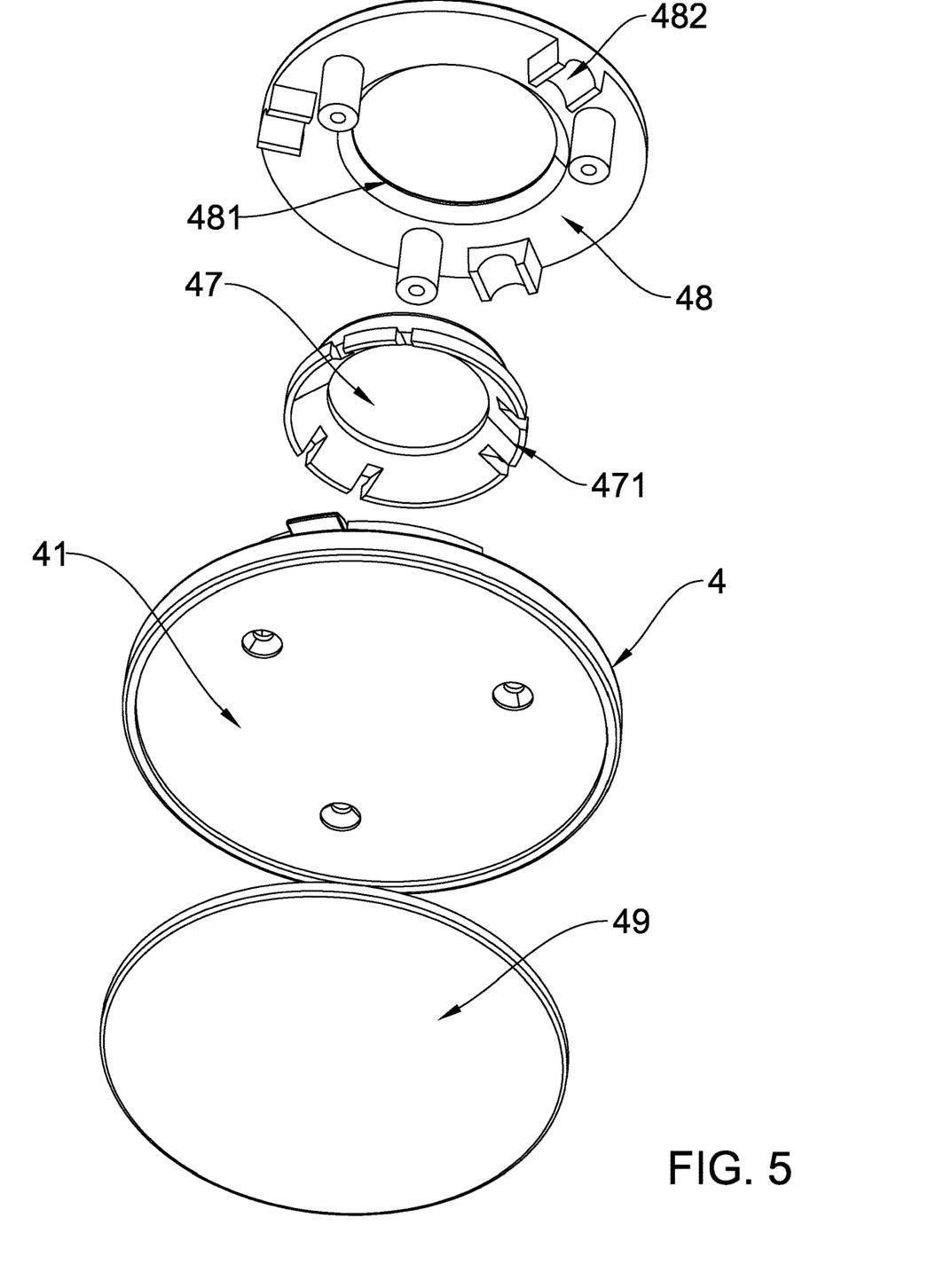
FIG. 5 is another exploded view of the connector.

As shown in FIGS. 4 and 5 specifically, the pressure block 471 abuts against a beveled surface on the slant block 45. When the snap-fastener 47 is pressed, the snap-fastener 47 drives the pressure block 471 to vertically move down and abut against the slant block 45. Therefore, when being abutted, the beveled surface on the slant block 45 compresses the pressure spring 46 and slides along pressure block 471. When the snap-fastener 47 is released, the pressure spring 46 springs back to drive the slant block 45 to be against the pressure block 471, to enable the pressure block 471 to drive the snap-fastener 47 to enter the inner part of the through hole 481. This facilitates pressing by the user. Because a beveled surface is disposed on the limiting buckle 44, when the second bracket 2 is assembled to the connector 4, when the beveled surface of the limiting buckle 44 is directly abutted, the limiting buckle 44 is driven to be retracted to the inner part of the first movable slots 42. The snap-fastener 47 does not need to be pressed, and only needs to be pressed during disassembly.

In a specific technical solution of the embodiment, at least one second movable slot 43 is disposed in the inner part of the base 41 at equal intervals in an annular shape, the spring bead 431 is movably disposed in an inner part of the second movable slot 43, and a quantity of the spring beads 431 is equal to a quantity of the second movable slots 43. The second movable slot 43 is used to mount the spring bead 431. The spring bead 431 includes a bead and a straight barrel that sleeves the bead. A spring is disposed in an inner part of the straight barrel. When the second bracket 2 drives the tooth slot 21 to rotate on the base 41, the tooth slot 21 is frequently switched to abut against the spring bead 431. When the bead of the spring bead 431 is abutted, the spring is compressed backward, and clamped into an inner part of a next tooth slot 21 while the tooth slot 21 is switched, to position the rotated second bracket 2.

In a specific technical solution of the embodiment, a clamping groove 482 of which one end extends to the inner part of the second movable slot 43 and is clamped with the spring bead 431 is disposed on a side of the cover plate 48. Due to the clamping groove 482, stabilization of mounting the spring bead 431.

In a specific technical solution of the embodiment, an adhesive mat 49 is disposed on a side, far away from the cover plate 48, of the base 41. The base 41 may be adhered to a different scenario such as an object or a platform through the adhesive mat 49.

During use in a car, the base 41 is adhered to a center console of the car through the adhesive mat 49, and the first bracket 1 is attached to the mobile phone through the magnet 14. The hinging arm 3 and the second bracket 2 are flipped out from the inner part of the accommodation hole 11, and the second bracket 2 is flipped out from an inner part of the placement slot 31, and the second bracket 2 is sleeved on the connector 4. The second bracket 2 abuts against the limiting buckle 44. When the limiting buckle 44 is abutted, the spring is compressed backward. When the second bracket 2 crosses the limiting buckle 44, the limiting buckle 44 is abutted by rebound of the spring and reset to clamp the second bracket 2, to steadily sleeve the second bracket 2 on the connector 4. When an angle of the second bracket 2 needs to be adjusted, the second bracket 2 can be rotated at 360° on the surface of the base 41. After being rotated, the second bracket 2 can be clamped into the tooth slot 21 to position. In the office scenario, the base 41 can be adhered to a back of a screen of a desktop computer or a laptop through the adhesive mat 49. Therefore, the mobile phone is suspended on a side of the computer, so that the user can conveniently view information. Alternatively, the base 41 can be mounted on the desktop for use, or the connector 4 can be separated from the second bracket 2. Therefore, the second bracket 2 can be sleeved in a finger of the user, to realize handheld support. Alternatively, the second bracket 2 can be accommodated in the accommodation hole 11.

The invention has the following advantages and benefits in comparison with a single-function magnetic bracket of the conventional art: the two-in-one multi-functional magnetic bracket can be used on a desktop, and can be suspended on a side of an office computer or mounted in a center console of a car through the base. When the connector is separated from and the second bracket, the second bracket can be sleeved in a finger as a finger ring, to realize handheld support. When the two-in-one multi-functional magnetic first brackets used on the desktop, the two-in-one multi-functional magnetic bracket can be adjusted and supported at 360°. The two-in-one multi-functional magnetic first brackets applicable to a variety of scenarios and platforms, to ensure usability of the product. The product has an application prospect.

While the invention has been described in terms of preferred embodiments, those skilled in the art will recognize that the invention can be practiced with modifications within the spirit and scope of the appended claims.

What is claimed is:

1. A multi-functional magnetic bracket, comprising:
a first bracket, wherein a magnet is embedded in an inner part of the first bracket, to enable the first bracket to be magnetically attached to a mobile phone;
a second bracket, wherein the second bracket is movably connected to the first bracket through a connecting arm, the second bracket and a hinging arm are accommodated to the inner part of the first bracket by flipping, and a ring and a tooth slot are opened in an inner part of the second bracket; and
a connector, snapped in the inner part of the second bracket and combined with the second bracket to form a multi-platform bracket for mounting the second bracket on different scenarios and platforms, wherein the connector comprises a base of which a surface is adhered to the platform, a limiting buckle that is disposed in an inner part of the base and of which one end extends to a side of the second bracket, and a spring bead that is disposed in the base and of which one end extends to an inner side of the tooth slot, when the limiting buckle is pulled away from the second bracket, the second bracket is pulled, to separate the second bracket from the connector.

2. The multi-functional magnetic bracket of claim 1, wherein the first bracket is in an annular shape, and an accommodation hole is opened in the first bracket, to accommodate the second bracket and a wireless charger, a first notch is opened on a surface of the first bracket, and a first rotation axis is disposed in an inner part of the first notch.

3. The multi-functional magnetic bracket of claim 2, wherein the second bracket is in an annular shape, and a second notch is opened on a surface of the second bracket, a second rotation axis is disposed in an inner part of the second notch, one end of the hinging arm extends to the inner part of the first notch and is snapped to a surface of the first rotation axis, and the other end of the hinging arm extends to the inner part of the second notch and is snapped to a surface of the second rotation axis.

4. The multi-functional magnetic bracket of claim 3, wherein a placement slot in which the second bracket is placed is opened on a side of the hinging arm, a slip resistant pad that is used to cover the magnet is disposed on one side of the first bracket, and a decorative sticker is disposed on the other side of the first bracket.

5. The multi-functional magnetic bracket of claim 1, wherein at least one first movable slot is disposed in the inner part of the base at equal intervals in an annular shape, the limiting buckle is movably disposed in an inner part of the first movable slot, a quantity of the limiting buckles is equal to a quantity of the first movable slots, and a pressure spring of which one end abuts against one phase of the limiting buckle is disposed in the inner part of the first movable slot.

6. The multi-functional magnetic bracket of claim 1, wherein a slant block 45 is disposed at one end of a limiting buckle located in the first movable slot, a snap-fastener is movably disposed on a side of the base, a press block corresponding to the slant block is disposed on the snap-fastener, when the snap-fastener is pressed, the snap-fastener drives the press block to abut against the slant block, and the slant block is abutted to drive the limiting buckle to compress the pressure spring and separate from the second bracket.

7. The multi-functional magnetic bracket of claim 6, wherein a cover plate is disposed on the side of the base, a through hole is opened in an inner part of the cover plate, and a side of the snap-fastener extends to an inner part of the through hole.

8. The multi-functional magnetic bracket of claim 7, wherein at least one second movable slot is disposed in the inner part of the base at equal intervals in an annular shape, the spring bead is movably disposed in an inner part of the second movable slot, and a quantity of the spring beads is equal to a quantity of the second movable slots.

9. The multi-functional magnetic bracket of claim 8, wherein a clamping groove of which one end extends to the inner part of the second movable slot and is clamped with the spring bead is disposed on a side of the cover plate.

10. The multi-functional magnetic bracket of claim 9, wherein an adhesive mat is disposed on a side, far away from the cover plate of the base.

* * * * *